United States Patent
Verbeke-Ensch et al.

(10) Patent No.: US 6,401,777 B1
(45) Date of Patent: Jun. 11, 2002

(54) TIRE CHIPPER CONSTRUCTION FOR RUNFLAT TIRES

(75) Inventors: Agnes Nathalie Iwana Verbeke-Ensch, Arlon (BE); Charles Pierre Jean-Marie Nosbusch, Mertzig (LU); Roland Close, Burg-Reuland (BE); Edouard Schenten, Schieren (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/546,051

(22) Filed: Apr. 10, 2000

(51) Int. Cl.[7] .......................... B60C 15/00; B60C 17/00; B60C 9/00

(52) U.S. Cl. .................. 152/517; 152/539; 152/543; 152/544; 152/546; 152/554

(58) Field of Search ................................ 152/539, 516, 152/517, 542, 543, 555, 541, 518–520, 544, 546, 552, 554

(56) References Cited

U.S. PATENT DOCUMENTS

| | | | |
|---|---|---|---|
| 3,253,693 A | 5/1966 | Ayres, Jr. | |
| 3,703,203 A | 11/1972 | Simpson | |
| 3,983,918 A | * 10/1976 | French | 152/209.1 |
| 4,047,551 A | 9/1977 | Mezzanotte | |
| 4,067,374 A | 1/1978 | Alden et al. | |
| 4,166,491 A | * 9/1979 | Mazzanotte | 152/354 |
| 4,319,621 A | * 3/1982 | Motomura | 152/362 |
| 4,436,130 A | 3/1984 | Suzuki et al. | |
| 4,609,023 A | 9/1986 | Loser | |
| 4,649,976 A | 3/1987 | Cherveny et al. | |
| 4,941,523 A | 7/1990 | Galante et al. | |
| 4,962,803 A | 10/1990 | Welter | |
| 5,042,546 A | 8/1991 | Forney et al. | |
| 5,080,158 A | * 1/1992 | Kawamura | 152/541 |
| 5,261,474 A | 11/1993 | Lobb et al. | |
| 5,429,168 A | 7/1995 | Lobb et al. | |
| 5,464,051 A | 11/1995 | Beard et al. | |
| 5,509,455 A | 4/1996 | Warchol et al. | |
| 5,535,800 A | 7/1996 | Abbott | |
| 5,637,164 A | 6/1997 | Dwenger et al. | |
| 5,651,845 A | 7/1997 | Watkins et al. | |
| 5,779,829 A | 7/1998 | Prakash et al. | |
| 5,851,324 A | * 12/1998 | Oare | 152/517 |

FOREIGN PATENT DOCUMENTS

JP          06092113    * 4/1994

* cited by examiner

*Primary Examiner*—Michael W. Ball
*Assistant Examiner*—Justin Fischer
(74) *Attorney, Agent, or Firm*—Howard M. Cohn (57) ABSTRACT

A chipper (40, 43, 54) for use in a pneumatic radial ply runflat tire (49) comprises cord reinforcements (42, 42') making an angle, α' of between 30° and 50° relative to the circumferential direction. The radially outermost edge (46, 50) of the chipper is located between 10 and 15 millimeters above the wheel rim flange (56) of the wheel-mounted tire and between 5% and 20% of the section height SH of the tire. The chipper is disposed axially inward of the ply turnup end (58). The chipper (40) may comprise a single layer of cords (42), or the chipper (43) may comprise two layers (47, 47') with the -cords (42, 42') in the two layers being crossed to form mirror images across a radial reflection axis.

3 Claims, 5 Drawing Sheets

TIRE CHIPPER CONSTRUCTION FOR RUNFLAT TIRES

TECHNICAL FIELD

The present invention relates to runflat pneumatic tires for motor vehicles and more specifically, to bead-region chipper-type reinforcements to improve riding comfort and tire durability at high speeds and during runflat operation.

BACKGROUND OF THE INVENTION

Modern pneumatic vehicle tires typically include a pair of axially separated, inextensible beads which serve to hold the tire on a wheel rim as well as to provide a structural foundation for the reinforced carcass plies to which the other tire components, such as the sidewalls and tread, are attached. A circumferentially disposed bead filler apex extends radially outward from each of the two beads.

One or more carcass plies extend between the two beads, by way of the sidewalls and the tire crown. Each carcass ply has two axially opposite end portions. The end portions of at least one carcass ply are turned up around, or clamped to, the beads, thereby anchoring the ends of one or more carcass ply layers. During tire construction, tread rubber and sidewall rubber are applied axially and radially outward of the one or more reinforced carcass plies.

The bead region of the sidewall is one part of the tire that contributes a substantial amount to the rolling resistance or rolling friction of the tire. The rolling resistance corresponds to an energy loss taking place within the tire's structure and is related to the cyclical flexure of the tire components, including the tread and its underlying structures such as the belts, as well as, especially, the portions of the sidewall that are closest to the bead regions where the flexural strain, and energy loss, is greatest.

The energy losses associated with a tire's rolling resistance correspond to heat accumulation within the tire's structure. Under conditions of severe operation, as at high speed or during operation of an uninflated runflat tire having extended mobility properties, flexure-induced heating in the bead region portion of the sidewalls can be especially problematic.

U.S. Pat. No. 3,253,693 discloses data on radial and circumferential deformations within tires. The deformations that take place in the bead region of the sidewalls result in shearing stresses during normal operation of the tire and especially during severe operating conditions. Bead-region shear stresses have both circumferential and radial orientation. The resulting shear strains or deformations correlate with high flexure within the bead regions. In the case of runflat or extended mobility technology (EMT) tires, sidewall flexure in the bead region can lead to a shortened runflat operational service life. More specifically, EMT tires operating under runflat conditions inevitably undergo deterioration and failure after operation for a certain distance; often the failure mode involves complete cracking of the parts of the tire (i.e., the chafers) that make the most immediate contact with the steel wheel rim's radially extending edge. The chafer cracks are oriented at 45 degrees indicating a shear strain effect in the bead regions.

Recent investigations have shown a high difference of radial-circumferentially oriented shear strains between the footprint area and the part of the tire that is 180 degrees from the footprint, i.e., the top of tire. This difference between the shear strains at the top and bottom of the tire is also referred to as the cycle amplitude of shearing strain, a variable which, when extreme, correlates with chafer cracking during the uninflated operation of EMT tires.

Among the methods used to reinforce the bead region of radial-ply tires is the incorporation of "chippers." A chipper is a circumferentially deployed metal or fabric layer that is disposed within the bead region in the portion of the tire where the bead fits onto the wheel rim. More specifically, each of the chipper(s)(one or more) used in each bead region of a given tire typically lies inward of the wheel rim (i.e., toward the bead) and inward (i.e., radially inward, relative to the bead viewed in cross section) of the portion of the ply that turns upward around the bead. Typical single chippers are made of parallel-aligned, metal or polymer cords that are oriented at an angle of 25 degrees with respect to the circumferential direction.

The width of the chipper is the distance to which it extends radially outward from the bead region. The width of the chipper is one variable that can be used to "tune" a tire's handling and steering performance. Chippers typically extend to a radial distance of to about 20 millimeters above the wheel's rim flange.

Generally, chippers provide a stiffening influence to the radially inward portion of the sidewall most adjacent to the bead region. The stiffening increases the resistance to cyclical flexure of the sort referred to above. In other words, the increased stiffness afforded by chippers works to reduce the amount of flexural deformation and resultant shearing stresses and strains in the axially inward portions of the sidewalls that are most immediately adjacent to the beads.

The use of wire chippers in standard non-EMT tires improves handling and steering performance, especially at high speeds. The formation of standing waves in non-EMT tires during high-speed operation can also be inhibited by the stiffness/damping characteristics of the final tire design, including the choice of chipper width. Flatspotting, i.e. the tendency of the tread of a tire to sustain a flat spot in the ground-contacting portion of the tread when a vehicle has been parked or otherwise sitting for a prolonged period, is also alleviated by the use of chippers.

A balanced design for a chipper-reinforced bead assembly of a tire would include stress characteristics that lead to reduced flexural energy generation (heat buildup) and to strain characteristics that can be uniformly borne by mutually adjacent tire components in the bead region. The objective of a balanced design is to achieve high-speed handling and steering benefits without compromising riding comfort due to the increased rigidity associated with typical chipper designs.

OBJECTS OF THE INVENTION

It is an object of the present invention to provide an optimized chipper design for use in a runflat radial tire as defined in one or more of the appended claims and, as such, having the capability of accomplishing one or more of the following subsidiary objects.

One object of the present invention is to provide an improved chipper design that minimizes the shear strain cycle amplitude in the bead region of runflat tires during runflat operation in order to minimize the formation of cracks in the chafer region.

Another object of the present invention is to provide an improved chipper design that reduces the flatspotting tendency of a runflat tire during normal-inflated service.

Yet another object of the present invention is to provide an improved chipper design that serves to minimize the potential for the formation of standing waves during high-speed, normal-inflated operation.

And another object of the present invention is to provide an improved chipper design that contributes to improved vehicle comfort and handling during normal-inflated operation while contributing to the tire's runflat durability.

SUMMARY OF THE INVENTION

The present invention relates to a pneumatic runflat radial ply tire having a tread, a carcass comprising at least a radial ply, a belt structure located between the tread and the radial ply, two inextensible beads, and two sidewalls with inserts. The respective bead regions of the runflat tire are reinforced with circumferentially disposed chippers in order to minimize the formation of cracks in the chafer region caused by runflat operations. Each chipper contains reinforcing cords (preferably wires) that are oriented at an angle of between 30° and 50° in the circumferential direction. The radially outermost end of each chipper is located between 5% and 20% of the section height above the wheel rim flange of the wheel-mounted tire. And the chipper is disposed axially inward of the turnup end of the turned up ply.

An alternative chipper design is positioned and sized similarly, but comprises two layers of crossed reinforcement cords.

BRIEF DESCRIPTION OF THE DRAWINGS

The structure, operation, and advantages of the invention will become more apparent upon contemplation of the following description taken in conjunction with the accompanying drawings, wherein.

DEFINITIONS

"Apex" or "bead filler apex" means an elastomeric filler located radially above the bead core and between the plies and the turnup plies.

"Axial" and "Axially" means the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Carcass" means the tire structure apart from the belt structure, tread, undertread over the plies, but including the beads.

"Chipper" refers to a narrow band of fabric or steel cords located in the bead area whose function is to reinforce the bead area and stabilize the radially inwardmost part of the sidewall.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"EMT tire" stands for Extended Mobility Technology and EMT tire means the same as "runflat tire," which refers to a tire that is designed to provide at least limited operational service under conditions when the tire has little to no inflation pressure.

"Equatorial Plane" means the plane perpendicular to the tire's axis of rotation and passing through the center of its tread; or the plane containing the circumferential centerline of the tread.

"Flatspotting" is the tendency of the tread of a tire to sustain a flat spot in the ground-contacting portion of the tread when a vehicle has been parked or otherwise sitting for a prolonged period.

"Gauge" refers generally to a measurement and specifically to thickness.

"Lateral" means a direction parallel to the axial direction.

"Ply" means a cord-reinforced layer of rubber-coated radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Sidewall" means that portion of a tire between the tread and the bead.

"Tread width" means the arc length of the tread surface in the plane includes the axis of rotation of the tire.

"Turnup end" means the portion of a carcass ply that turns upward (i.e., radially outward) from the beads about which the ply is wrapped.

DETAILED DESCRIPTION OF THE PREFERRED EMBODIMENT

Figure 1:
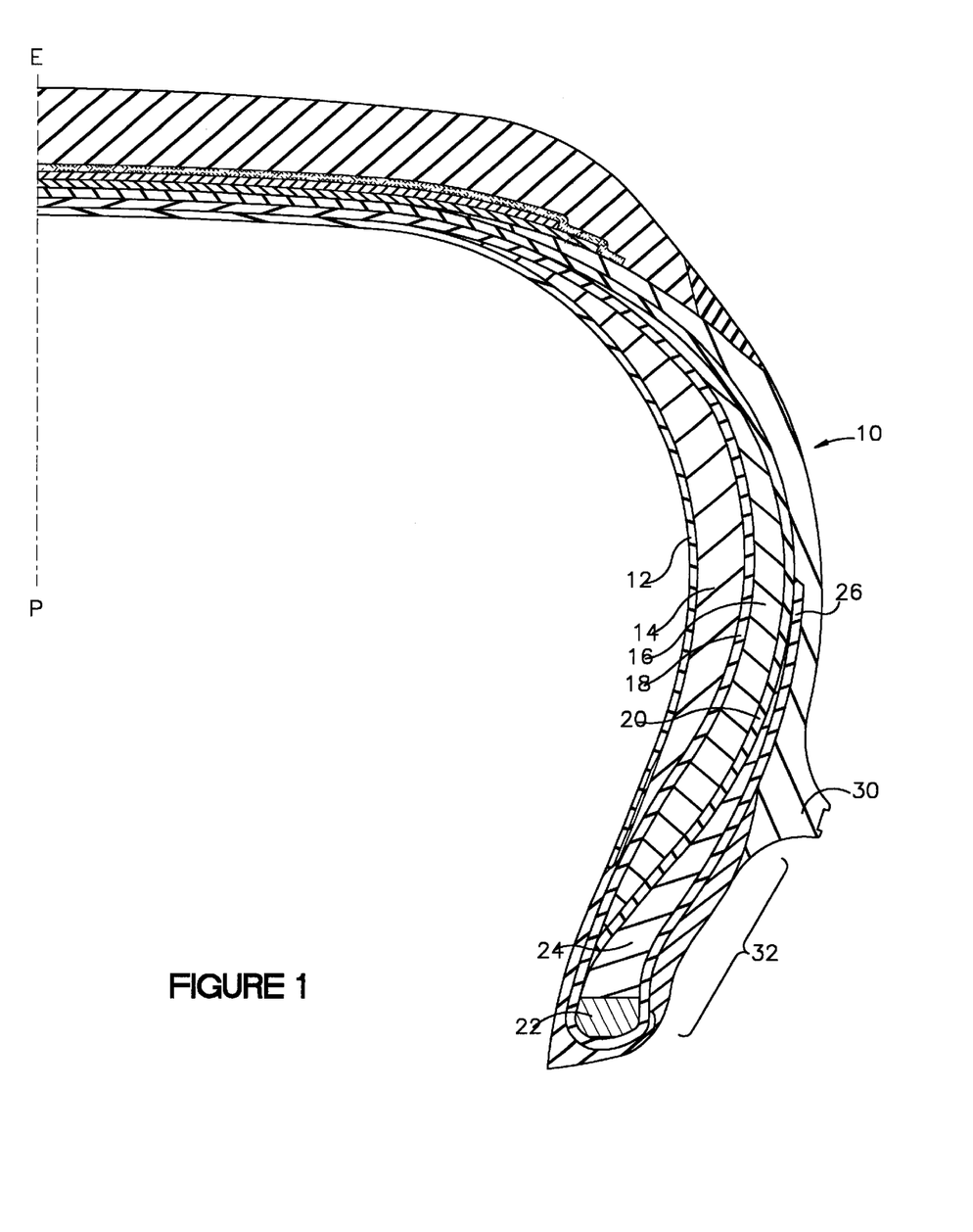
FIG. 1 is a cross-sectional view showing the bead region of the radially inwardmost portion of the sidewall of a runflat tire.

FIG. 1 is a cross-sectional view of the bead region 10 of a typical two-wedge-insert-per-sidewall runflat tire. The tire's inner liner 12 lies adjacent to the first wedge insert 14 which is bounded on its far side from the inner liner by the first carcass ply 18. The second wedge insert 16 is disposed between the first carcass ply 18 and the second carcass ply 20. The first carcass ply 18 is wrapped around the bead 22 and has a turn-up end 26 that terminates radially outward from the bead, possibly above the wheel-rim retainer lip 30 or at the middle section of the sidewall where the section width is the greatest.

Shearing strains arise during runflat service in the portion 32 of the bead region that extends from the bead 22 to the lower part of the tire's wheel-rim retainer lip 30.

Figure 2:
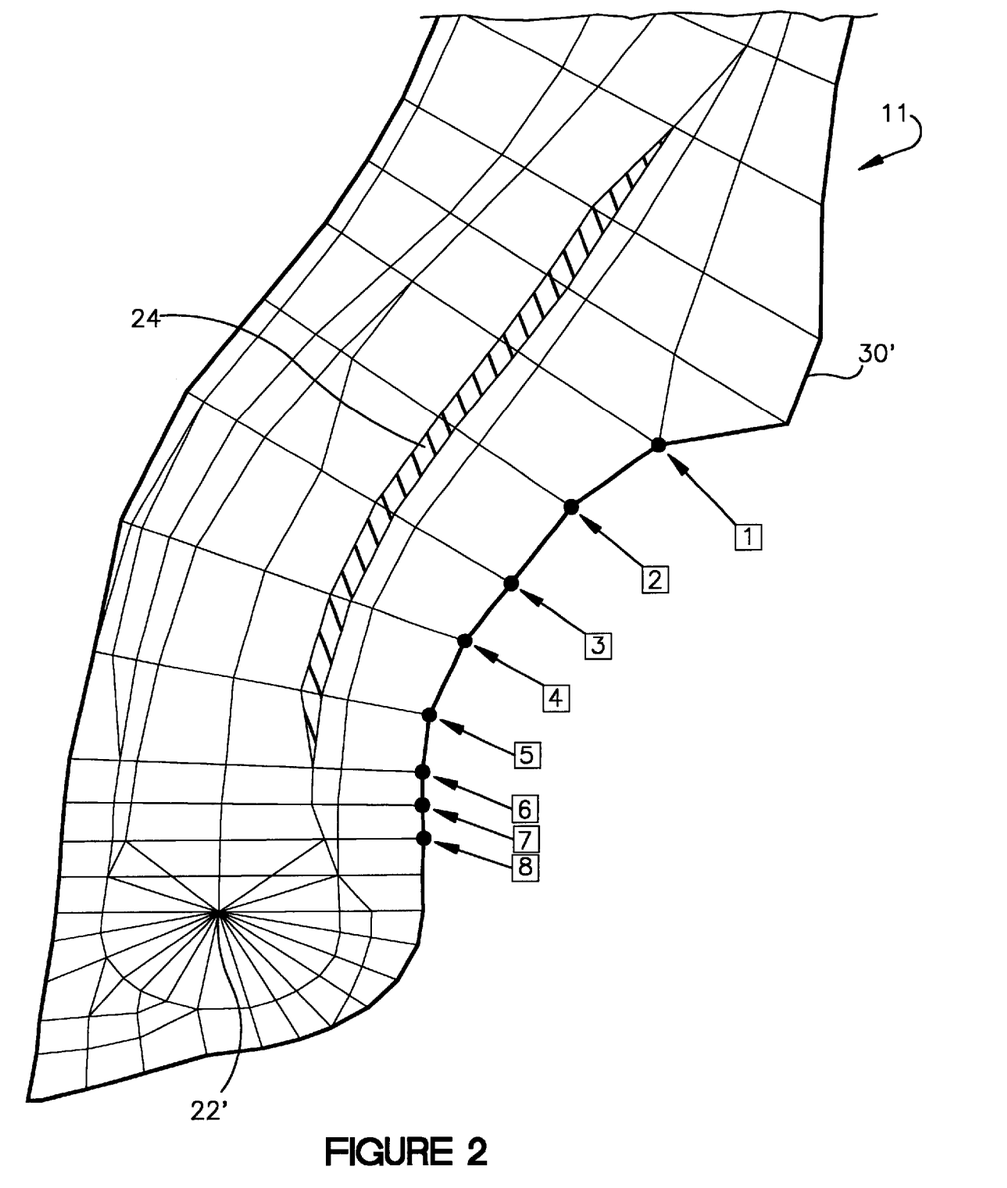
FIG. 2 is a finite element analysis diagram showing the locations in the bead region at which shearing strains were calculated.

FIG. 2 is a portion 11 of a finite-element analysis (FEA) diagram of bead region 10 shown in cross-section in FIG. 1.

The wheel-rim retainer lip 30', which is also known as a rim flange protector, and the bead 22' are denoted. Throughout the specification, primed numbers represent structural elements which are substantially identical to structural elements represented by the same unprimed number. The boxed numbers 1 through 8 delineate points at which shearing strains were calculated by means of FEA during computer-simulated runflat operation of the tire containing a circumferentially disposed chipper 24 of varying designs in each a tire's two bead regions.

Figure 3:
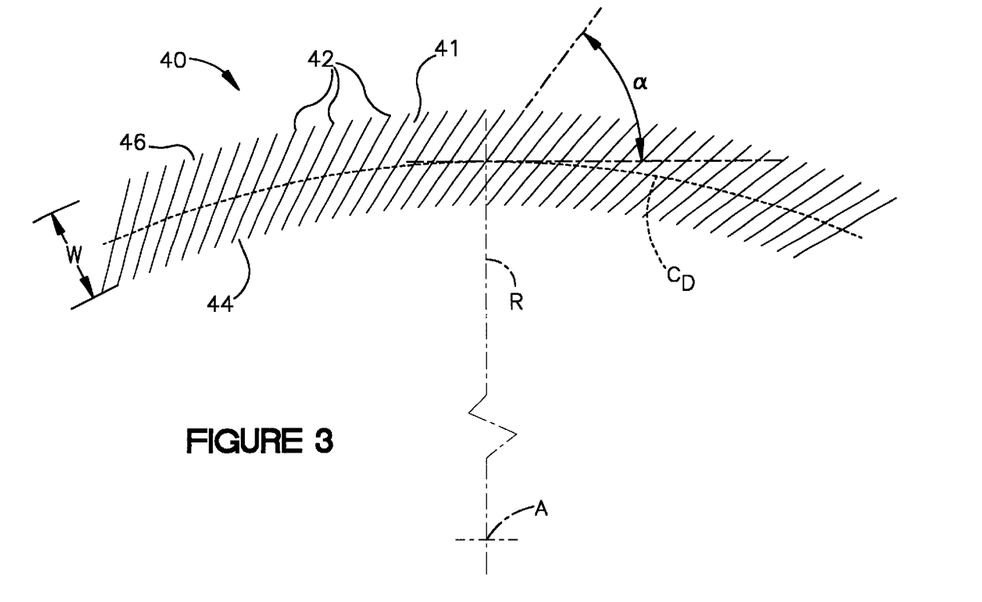
FIG. 3 is a side view of the reinforcing cords of a chipper of the present invention, showing the reinforcing cords and their angles with respect to the circumferential direction.

Since this invention relates to chipper designs for runflat tires, FIG. 3 provides a side view (or axially directed view) of the main structural elements of a chipper 40. The chipper 40 is a narrow band 41 of reinforcing cords 42, typically in rubber and forced into a circular configuration. The angle $\alpha$ of the reinforcing cords 42 of chipper 40 is shown, highlighting a chipper's relationship to the radius R extending from the tire's axis A. The angle $\alpha$ is measured with respect to the circumferential direction $C_D$, which is perpendicular to the radius R about the tire's axis of rotation A.

Figure 4:
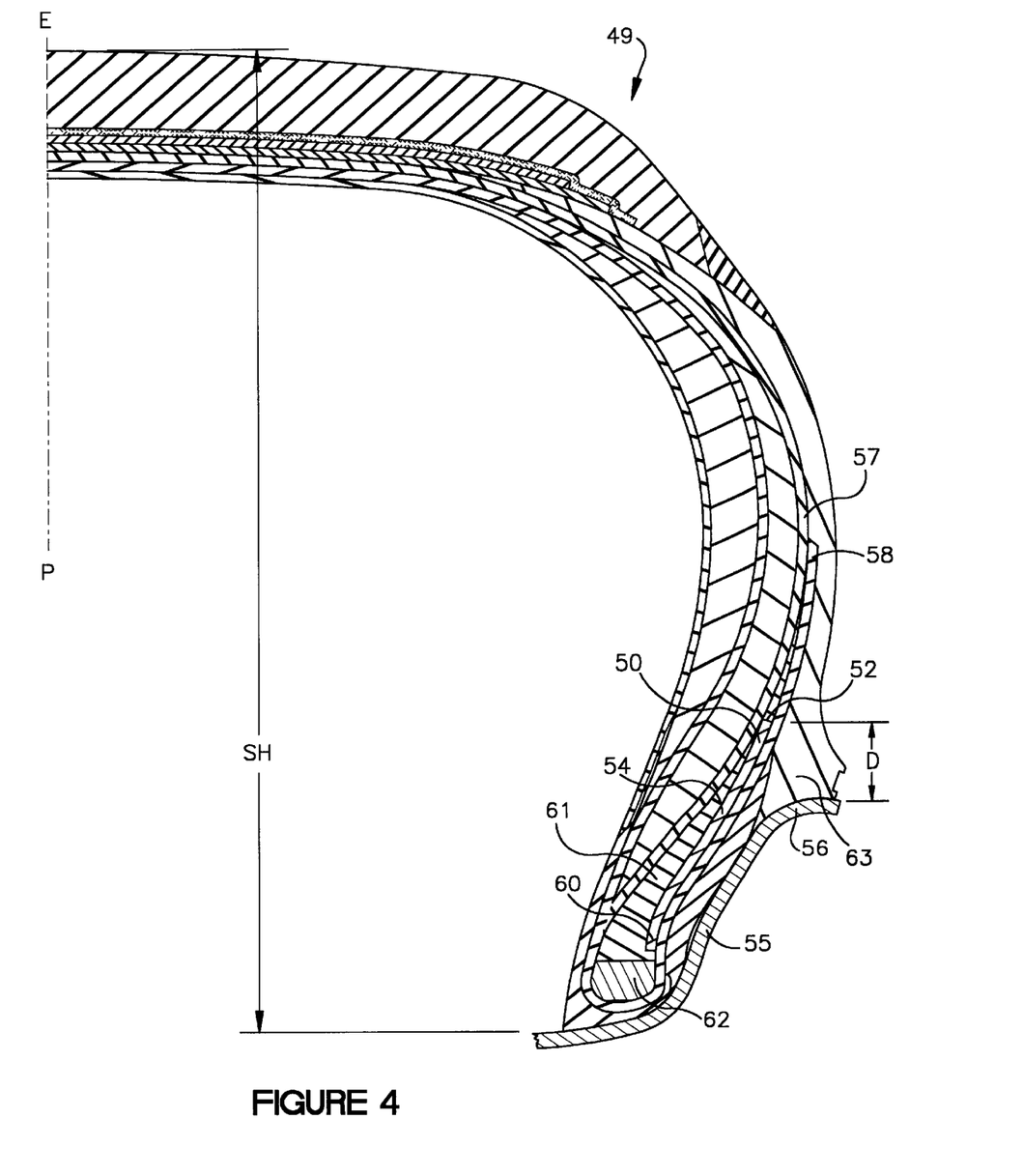
FIG. 4 is a cross-sectional view of the bead region and radially inwardmost portion of one sidewall of a runflat tire incorporating the present invention.

The angle $\alpha$ is one variable in chipper design. Another design variable is the chipper's width, denoted by W in FIG. 3, which is measured from the radially inwardmost edge or end 44 of the chipper to the radially outwardmost edge or end 46. The structure of the cords 42 is yet a third design variable in chipper design. For example, the cords can be constructed of wire, flexten, rayon, nylon and polyester and typically with 15–35 EPI (ends per inch). Yet a fourth chipper design variable is the location of the chipper with respect to the turnup ply 26 shown in FIG. 1. That is, the chipper's location can be varied in both the radial and axial directions. In the latter instance, it can be located axially outward of the turn-up end 26 (FIG. 1) or axially inward of the turn-up end as shown in FIG. 4. Prior art chipper locations place the chipper axially outward of the turn-up end 26.

Figure 3A:
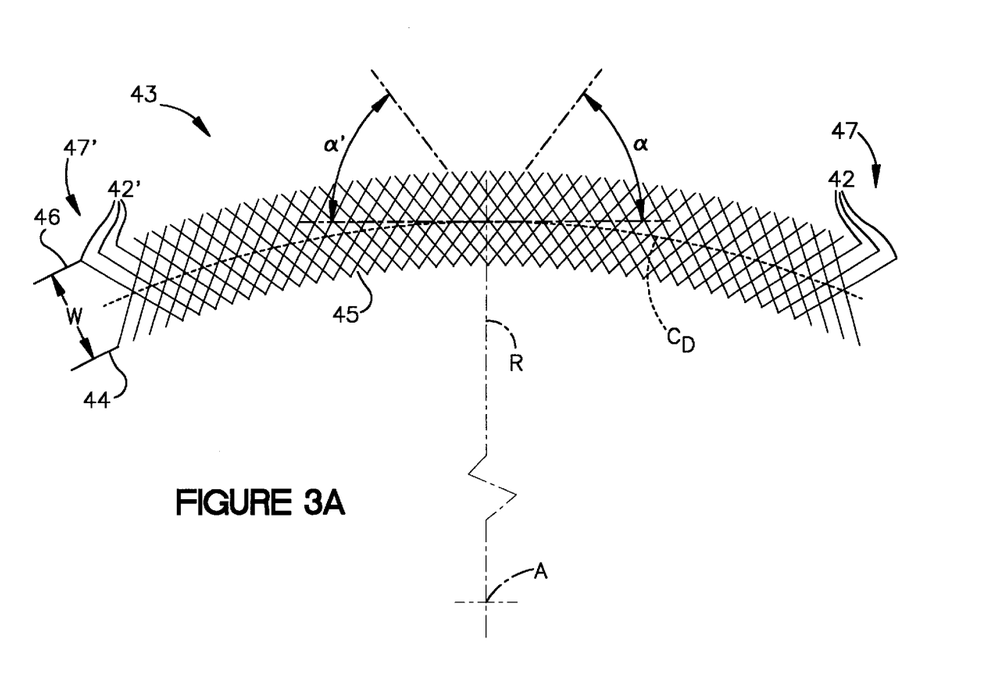
FIG. 3A is a side view of the reinforcing cords of an alternate embodiment of a chipper of the present invention, showing crossed reinforcing cords and their angles with respect to the circumferential direction.

An alternate embodiment of the chipper of this invention is a crossed-cord chipper 43, illustrated in FIG. 3A as a side view (or axially directed view). The crossed-cord chipper 43 is a narrow band 45 of reinforcing cords 42, 42', typically in rubber and forced into a circular configuration. The band 45 consists of two layers 47, 47' of reinforcing cords 42, 42'. The reinforcing cords 42 of the first layer 47 of the crossed-cord chipper 43 are at an angle $\alpha$ relative to the circumferential direction $C_D$, which is perpendicular to the radius R about the tire's axis of rotation A. The reinforcing cords 42' of the second layer 47' of the crossed-cord chipper 43 are at an angle $\alpha'$ relative to the circumferential direction $C_D$, which is perpendicular to the radius R about the tire's axis of rotation A. The angle $\alpha'$ is preferably equal in magnitude to angle $\alpha$, but oriented (as illustrated) in the "opposite direction," i.e., the reinforcing cords 42' are a mirror image of the reinforcing cords 42 with the radius R being the reflection axis. The first 47 and second 47' layers are suitably bonded together to form the crossed-cord chipper 43 alternate embodiment of the chipper of this invention.

The angles $\alpha$ and $\alpha'$ are one design variable for the crossed-cord chipper 43. Another design variable is the chipper's width, denoted by W in FIG. 3A, which is measured from the radially inwardmost edge or end 44 of the crossed-cord chipper 43 to the radially outwardmost edge or end 46. The structure of the cords 42, 42' is yet a third design variable in chipper design. For example, the cords 42, 42' can be constructed of wire, flexten, rayon, nylon and polyester and typically with 15–35 EPI. Yet a fourth chipper design variable is the location of the chipper 43 with respect to the turnup ply 26 shown in FIG. 1. That is, the chipper's location can be varied in both the radial and axial directions. In the latter instance, it can be located axially outward of the turn-up end 26 (FIG. 1) or axially inward of the turn-up end as shown in FIG. 4.

Finite Element Analysis of Bead Region Shearing Strains

Referring to FIG. 2, the boxed locations 1 through 8 show the points at which shearing stresses were examined by FEA as a function of chipper cord angles $\alpha$ and chipper width W. All chippers were made of wire cables. The specific test variables or conditions used in the FEA were as follows, where the angles refer to $\alpha$ (and an equal-valued $\alpha'$) as defined in FIGS. 3 and 3A:

Test Condition #1. No chipper.
Test Condition #2. 23° wire chipper having standard width ("width" here refers to radial height above the region adjacent to the bead).
Test Condition #3. 35° wire chipper having a standard width.
Test Condition #4. 23° extended wire chipper has a width of 15 to 25% greater than the standard width.
Test Condition #5. Two crossed-cord chippers have an angle of 35°. The chipper cords (wires) are crossed symmetrically with respect to the radial direction.

For each of the above computer-simulated test conditions (TC) the shear strains at the eight locations designated in FIG. 2 were calculated by FEA. The results of the FEA strain calculations are summarized in the following table:

| Location shown in | FEA-Derived Strain Values at Test Condition (TC) | | | | |
| --- | --- | --- | --- | --- | --- |
| FIG. 2 | TC #1 | TC #2 | TC #3 | TC #4 | TC #5 |
| 1 | 3.94E–02 | 3.54E–02 | 2.78E–02 | 2.17E–02 | 1.68E–02 |
| 2 | 4.50E–02 | 3.42E–02 | 3.08E–02 | 1.94E–02 | 1.53E–02 |
| 3 | 5.02E–02 | 3.00E–02 | 2.98E–02 | 2.15E–02 | 1.76E–02 |
| 4 | 5.27E–02 | 2.66E–02 | 2.81E–02 | 2.40E–02 | 2.26E–02 |
| 5 | 5.41E–02 | 3.16E–02 | 2.74E–02 | 2.91E–02 | 2.65E–02 |
| 6 | 5.08E–02 | 2.93E–02 | 2.42E–02 | 3.23E–02 | 3.15E–02 |
| 7 | 3.77E–02 | 2.26E–02 | 1.98E–02 | 2.50E–02 | 2.41E–02 |
| 8 | 2.96E–02 | 1.95E–02 | 1.63E–02 | 2.04E–02 | 2.07E–02 |

Figure 2A:
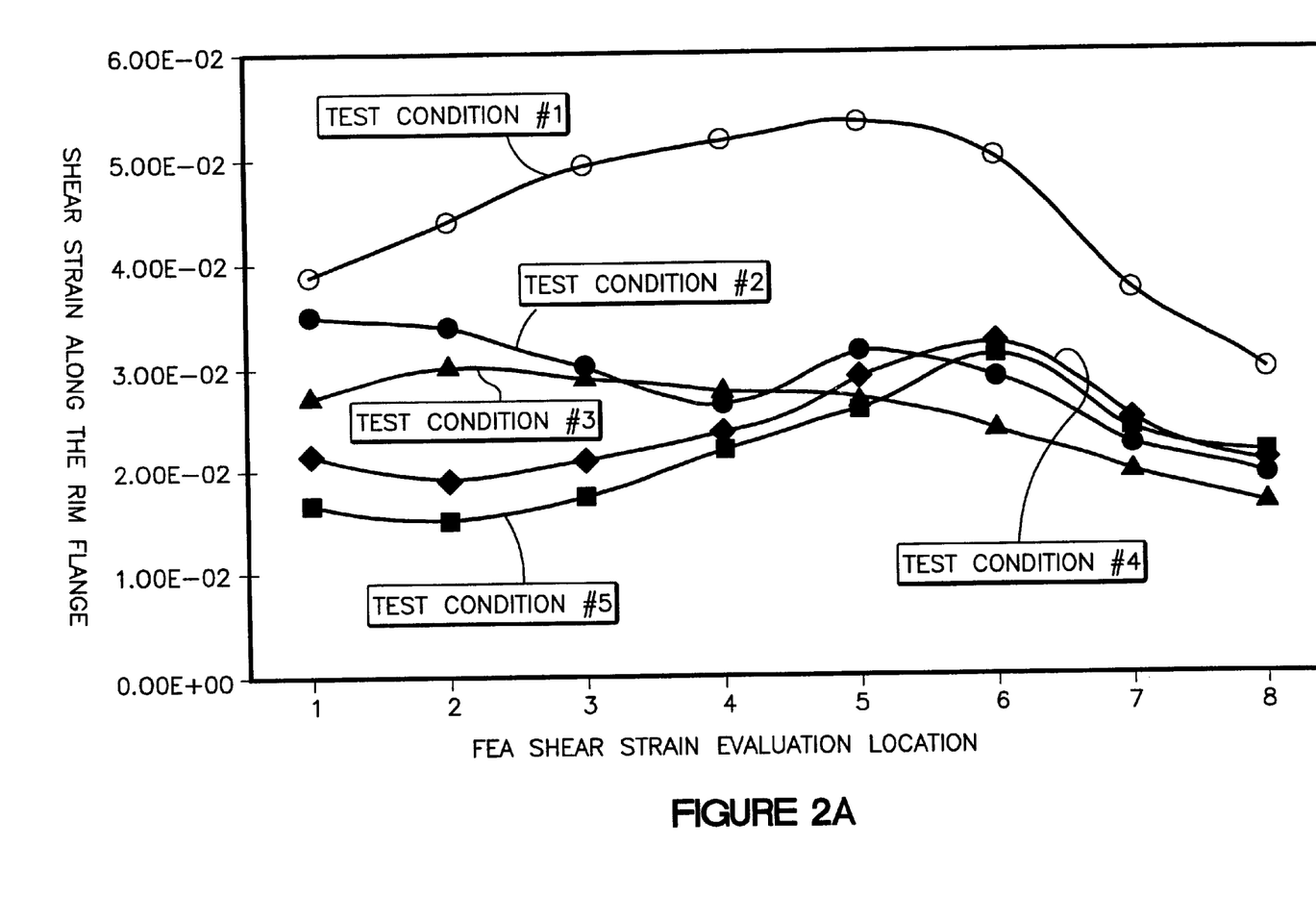
FIG. 2A is a plotted graph showing the FEA-derived strain values at the locations shown in FIG. 2.

The FEA-derived numbers listed in the table above are depicted graphically in FIG. 2A, showing the bead regions strains at the eight locations defined in FIG. 2.

FIG. 2A indicates that by increasing the cord chipper angle from the/standard value of about 23° to a value in the range of 30° to 50°, the stiffness in the bead area will be better balanced in terms of the maximum magnitudes of the shearing stresses. Or, in other words, for the six locations 1 through 8 shown in FIG. 2A, the relative strain differences, or cycle amplitude, at each station point 1 through 8 and for each of the five Test Conditions #1 through #8, are minimum for the Test Condition #5, i.e., 35° crossed-cord chipper.

The maximum magnitudes of the shearing strains were calculated as a comparison of the shearing strains that occurred in the eight locations of that portion of the bead region most adjacent to the ground-contacting portions, i.e., the footprint area, where the strains are maximum, of the tire and the shearing strains in the corresponding eight locations on the part of the bead region farthest removed from the ground-contacting portion of the tire where the strains are minimum. In other words, the shearing strains were compared between the bottom of the tire (i.e., where the tread makes contact with the ground) and the top tire (which is unloaded). The difference between the shear strains at the bottom of the tire and the top of the tire (in relation to the ground-contacting portion of the tire) is called the shear strain cycle amplitude. The effect of the reduction of the shear strain cycle amplitude is to reduce or eliminate the cracking in the chafer area of a tire operating in the runflat mode. This increases the runflat operational distance.

An improved balance between top and bottom of the tire, that is, a minimum shear strain cycle amplitude, reduces the amplitude of the standing waves which are known to provoke the high speed failure in normal-inflated operation. Furthermore, the increase in chipper cord angle α from about 23° to a value in the range of 30° to 50° beneficially influences the stiffness/damping characteristics of the tire. More specifically, the increase in the angle α leads to a better stiffness/damping balance between the bead-region portion 32 (in FIG. 1) of the tire and the corresponding tread portion. As a consequence of the improved stiffness/damping balance, a runflat tire containing such high-angle chipper provides a more comfortable, softer ride as well as improved flatspotting performance during normal-inflated operation.

The FEA also showed that the width W of the chipper 24 (FIG. 3) works well as a useful design parameter for tuning handling/steering performance of runflat tires. However, it was determined that in order to optimize the effect on riding comfort, as well as high-speed inflated durability and flatspotting, the width W should be kept to a minimum. Referring to FIG. 4, the optimum width W was determined to be such that the radially outermost portion 52 of the chipper 54 incorporated in a typical runflat tire 49 should be located at a distance D of 5% to 20% of the section height SH of a runflat tire 49, wherein the section height SH is defined as the distance from the radially inwardmost point of the tire in the bead area to the radially outwardmost point of the tire on the tread at the equatorial plane.

In summary, the finite element analysis showed that the higher angle α of 30° to 50° significantly reduced the shear strain cycle amplitude. The use of a crossed-cord chipper (the crossed cords each having an angle of 30° to 50°) was also beneficial in reducing the shear strain cycle amplitude by around 40%. If the angle of the chipper were greater than 50°, the cords within the chipper would have a tendency to cut through the ply and/or sidewalls during normal or runflat operations.

Balanced Chipper Design Usage in Runflat Tires

In runflat or EMT tires, the use of chippers contributes to the tire's runflat operational service life. On the other hand, the increased rigidity associated with the use of chippers tends adversely to affect the ride and comfort because of the stiffening effect of the chippers in combination with stiffening effects of the EMT tire's sidewall wedge-insert reinforcements.

A balanced design for a chipper-reinforced bead assembly of a tire would include stress characteristics that lead to reduced flexural energy generation (and heat buildup) and to strain characteristics that can be uniformly borne by mutually adjacent tire components in the bead region. The objective of a balanced design is to achieve high-speed handling and steering benefits without compromising riding comfort due to the increased rigidity associated with typical chipper designs.

Such a balanced design concept incorporating the benefits of chippers could apply to EMT tires by reducing the chafer-region flexure that leads to shear-stress-induced cracking and to a compromised runflat service life. In EMT tires, optimum chipper design would provide benefits to high-speed handling and steering as well as to runflat operational life. The latter increase in runflat operation life would be brought about by a chipper design that can reduce shearing strains in the bead-region portions of the sidewalls during runflat operation while, at the same time, not simultaneously increasing the normal-inflated overall stiffness of the sidewalls.

Actual Field Test

A chipper having the larger angle α of 35° was tested on a number of otherwise original equipment type tires. Compared to a construction with a chipper having a standard angle of 20–25°, high-speed reliability during inflated operation and general riding comfort were significantly improved without adversely affecting other performance variables. During the non-inflated operating mode, the cracking in the chafer area was substantially eliminated.

Shown in FIG. 4 is a chipper construction of the present invention incorporated on a tire 49 mounted on a wheel rim 55. The tire 49 is mounted on wheel rim 55 so that the bead region 61 which includes bead 62 is seated against the wheel flange 56 and extends from the bead 62 to the lower part of the tire's wheel-rim retainer lip 63. The chipper 54 is located axially inward of the ply turnup end 58 of ply 57. In that location, the chipper 54 extends between the radially outwardmost location 52 corresponding to the end 50 and the location 60 that is close to the bead 62, i.e. 1–10 mm (millimeters) above the bead. If the distance were greater than 10 mm, the chipper would no longer provide adequate support to reduce the occurrence of cracking in the chafer region. The chipper 54 in this location that is axially and radially inward, with respect to the axis of rotation of the tire, of the turnup end 58 and having cord angles α of between 30° and 50° and a width W that is adequate to allow the chipper's radially outwardmost end 52 to be at a distance D above the lower part of the tire's wheel-rim retainer lip 63 of between 5 and 20% of the section height SH of the tire. The chipper 54 can incorporate either the parallel cord or the crossed cord design shown in FIGS. 3 and 3A, respectively. The chipper 54 is contributory to minimizing the shear strain cycle amplitude, which leads to a reduction of cracking in the chafer during normal-inflated and runflat operation. The improved chipper designs of the present invention also contribute to low-speed comfort during inflated operation, and to handling during both normal-inflated and runflat conditions.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A pneumatic radial ply runflat tire, comprising two beads, a pair of sidewall portions, and at least one carcass ply wrapped around each bead to end in a ply turnup end located axially and radially outward of each bead, the tire being characterized by:

at least one sidewall insert in each sidewall portion;

a wheel-rim retainer lip protruding axially outward from the top of each bead area;

a chipper comprising a circular band of cords circumferentially disposed in each bead area axially inward of the corresponding ply turnup end;

the chipper having a radially outermost edge and a radially innermost edge, such that the chipper increases in radial distance from an axis of rotation of the tire as a function of distance from the chipper's radially innermost edge;

the chipper's radially innermost edge being at least 1 millimeter and no more than 10 millimeters radially outward of the bead;

the chipper's radially outermost edge being radially within the radially outermost extent of an axially outermost one of the at least one ply turnup end; and the chipper's radially outermost edge also being located above a lower part of the tire's wheel-rim retainer lip by a distance D having a magnitude of between 5% and 20% of the section height SH of the tire.

2. The runflat tire of claim 1, further characterized by:

a cord angle $\alpha$ of the chipper's band of cords between 30° and 50° with respect to a circumferential direction $C_D$.

3. The runflat tire of claim 1, further characterized by:

the chipper's band of cords comprising a first layer and a second layer;

the cords of the first layer having a first cord angle $\alpha$ between 30° and 50° with respect to a circumferential direction $C_D$;

the cords of the second layer having a second cord angle $\alpha'$ between 30° and 50° with respect to the circumferential direction $C_D$; and the cords of the first layer and the cords of the second layer being crossed so that the first cord angle $\alpha$ and the second cord angle $\alpha'$ are mirror images across a radial reflection axis.

* * * * *